(12) United States Patent
Garry et al.

(10) Patent No.: US 9,903,273 B2
(45) Date of Patent: Feb. 27, 2018

(54) METHOD AND AN APPARATUS FOR PRODUCING COOLING APERTURES IN A COMBUSTION CHAMBER HEAD

(71) Applicant: ROLLS-ROYCE PLC, London (GB)

(72) Inventors: Ian Murray Garry, Leicester (GB); Neil Geoffrey Hufton, Nottingham (GB)

(73) Assignee: ROLLS-ROYCE plc, London (GB)

( * ) Notice: Subject to any disclaimer, the term of this patent is extended or adjusted under 35 U.S.C. 154(b) by 401 days.

(21) Appl. No.: 14/798,002

(22) Filed: Jul. 13, 2015

(65) Prior Publication Data

US 2016/0025008 A1    Jan. 28, 2016

(30) Foreign Application Priority Data

Jul. 25, 2014    (GB) .................................. 1413193.2

(51) Int. Cl.
  *F23R 3/00*    (2006.01)
  *F02C 7/12*    (2006.01)
  (Continued)

(52) U.S. Cl.
  CPC ................ *F02C 7/12* (2013.01); *B23B 35/00* (2013.01); *B23B 51/06* (2013.01); *F23R 3/06* (2013.01);
  (Continued)

(58) Field of Classification Search
  CPC ...... F02C 7/12; F23R 3/06; F23R 3/20; F23R 3/28; F23R 2900/00018; B23B 51/06;
  (Continued)

(56) References Cited

U.S. PATENT DOCUMENTS 6,004,620 A * 12/1999 Camm .................... B23P 6/002
                                                              427/142
6,651,681 B1   11/2003 Hurskainen
2009/0218422 A1   9/2009 Goring et al.

FOREIGN PATENT DOCUMENTS

DE    40 15 412 C1    6/1991
DE    10 118 596 A1    10/2002
(Continued)

OTHER PUBLICATIONS

Dec. 8, 2015 Extended Search Report issued in European Patent Application No. 15176390.1.
(Continued)

*Primary Examiner* — Richard Chang
(74) *Attorney, Agent, or Firm* — Oliff PLC (57) ABSTRACT

A method of producing cooling apertures in a combustion chamber head includes mechanically drilling a plurality of cooling apertures through the combustion chamber head from the downstream side of the combustion chamber head. A tool is inserted through at least one aperture for a fuel injector from the downstream side of the combustion chamber head and the tool is rotated about its axis while within the aperture for a fuel injector. Fluid is supplied from the drilling machine through the tool and jets of fluid are directed from nozzles in the tool with at least a radial component towards the cooling apertures on the upstream side of the combustion chamber head to remove burrs and/or caps adjacent the cooling apertures. The present disclosure enables cooling apertures to be drilled through a combustion chamber head using conventional mechanical drilling in a viable and cost effective manner.

19 Claims, 4 Drawing Sheets

(51) Int. Cl.
*B23B 35/00* (2006.01)
*B23B 51/06* (2006.01)
*F23R 3/20* (2006.01)
*F23R 3/28* (2006.01)
*F23R 3/06* (2006.01)
*B33Y 80/00* (2015.01)

(52) U.S. Cl.
CPC ............... *F23R 3/20* (2013.01); *F23R 3/28* (2013.01); *B23B 2215/76* (2013.01); *B23B 2220/08* (2013.01); *B23B 2270/28* (2013.01); *B23B 2270/30* (2013.01); *B33Y 80/00* (2014.12); *F05D 2220/32* (2013.01); *F05D 2230/10* (2013.01); *F05D 2240/35* (2013.01); *F05D 2260/20* (2013.01); *F23R 2900/00018* (2013.01)

(58) Field of Classification Search
CPC . B23B 35/00; B23B 2270/28; B23B 2270/30; B23B 2220/08; B23B 2215/76; B33Y 80/00; F05D 2230/10; F05D 2240/35; F05D 2260/20; F05D 2220/32
See application file for complete search history.

(56) References Cited

FOREIGN PATENT DOCUMENTS

| | | |
|---|---|---|
| DE | 10 2006 028 393 A1 | 1/2007 |
| DE | 10 2009 030514 A1 | 1/2011 |
| EP | 1 859 896 A1 | 11/2007 |
| JP | H01-228799 A | 9/1989 |
| JP | 2006-224292 A | 8/2006 |
| WO | 2007/014828 A1 | 2/2007 |
| WO | 2010/089165 A1 | 8/2010 |
| WO | 2012/031906 A2 | 3/2012 |

OTHER PUBLICATIONS

Nov. 20, 2014 Search Report issued in British Application No. GB1413193.2.

* cited by examiner

FIG. 8 though the tool, directing a jet of fluid from the tool with at least a radial component towards the cooling apertures on the upstream side of the combustion chamber head to remove burrs and/or caps adjacent the cooling apertures.

METHOD AND AN APPARATUS FOR PRODUCING COOLING APERTURES IN A COMBUSTION CHAMBER HEAD

FIELD OF THE DISCLOSURE

The present disclosure relates to a method and an apparatus for producing cooling apertures in a combustion chamber head and in particular to a method and an apparatus for producing cooling apertures in a gas turbine engine combustion chamber head.

BACKGROUND TO THE DISCLOSURE

Gas turbine engine annular combustion chambers comprise an inner annular wall structure, an outer annular wall structure and an annular upstream end wall structure. The annular upstream end wall structure comprises an annular head and a plurality of heat shields. The heat shields are positioned downstream of the annular head and are secured to the annular head. The annular head is a cast structure and machined structure. The annular head is provided with a plurality of cooling apertures extending there-through to supply a coolant onto the upstream surfaces of the heat shields to provide impingement cooling of the heat shields. The heat shields are provided with pedestals on their upstream surfaces and/or have effusion cooling apertures extending there-through to provide further cooling of the heat shields.

The annular head also has a plurality of circumferentially spaced apertures, each one of which is arranged to receive a fuel injector. Each heat shield has a corresponding aperture arranged to receive a corresponding one of the fuel injectors.

The annular head, as mentioned previously, has a plurality of cooling apertures which have a diameter of 1.5 mm to 6.0 mm and these cooling apertures are conventionally machined through the annular head using electro-discharge machining (EDM) before the heat shields are fastened onto the annular head. These cooling apertures are drilled using electro-discharge machining (EDM) because the cooling apertures are drilled from the downstream side of the annular head and there is no easy access to the upstream side of the annular head to de-burr the cooling apertures. Electro-discharge machining (EDM) does not generate burrs and therefore if the cooling apertures are drilled using electro-discharge machining (EDM) no de-burring is required.

The electro-discharge machining (EDM) is a relatively slow method of drilling the cooling apertures when compared to conventional drilling, electro-discharge machining (EDM) is more prone to produce non-conformance of the cooling apertures when compared to conventional drilling and electro-discharge machining (EDM) is more prone to machine down time than conventional drilling.

However, conventional drilling produces burrs, or partially secured caps, at the exit of the cooling apertures on the upstream side of the combustion chamber head. These burrs, or partially secured caps, are difficult and costly to remove because there is no easy access to the upstream side of the annular head to de-burr the cooling apertures Therefore the present disclosure seeks to provide a novel method and apparatus for producing cooling apertures in a combustion chamber head which reduces or overcomes the above mentioned problem.

STATEMENTS OF DISCLOSURE

Accordingly the present disclosure provides a method of producing cooling apertures in a combustion chamber head, the combustion chamber head having an upstream side, a downstream side and at least one aperture extending therethrough for a fuel injector, the upstream side of the combustion chamber head is inaccessible, the method comprising providing a drilling machine, mechanically drilling a plurality of cooling apertures through the combustion chamber head from the downstream side of the combustion chamber head, inserting a tool through the at least one aperture for the fuel injector from the downstream side of the combustion chamber head, rotating the tool about its axis whilst within the at least one aperture for the fuel injector, supplying fluid from the drilling machine through the tool, directing a jet of fluid from the tool with at least a radial component towards the cooling apertures on the upstream side of the combustion chamber head to remove burrs and/or caps adjacent the cooling apertures.

The method may comprise directing a plurality of jets of fluid from the at least one passage in the tool with at least a radial component towards the cooling apertures on the upstream side of the combustion chamber head to remove burrs and/or caps adjacent the cooling apertures.

The method may comprise directing the at least one jet of fluid with an axial component towards the upstream side of the combustion chamber head.

The method may comprise directing a plurality of jets of fluid with axial components towards the upstream side of the combustion chamber head.

The method may comprise supplying machine coolant from the drilling machine through the tool.

The combustion chamber head may be an annular combustion chamber head having a plurality of circumferentially spaced fuel injector apertures, the method comprising inserting the tool through each aperture for a fuel injector from the downstream side of the combustion chamber head, rotating the tool about its axis whilst within the respective aperture for a fuel injector, supplying fluid from the drilling machine through the tool, directing a jet of fluid from the tool with at least a radial component towards the cooling apertures on the upstream side of the combustion chamber head to remove burrs and/or caps adjacent the cooling apertures.

The combustion chamber head may be an annular combustion chamber head having a plurality of circumferentially spaced fuel injector apertures, the method comprising providing a plurality of tools, inserting each tool through a respective one of the apertures for a fuel injector from the downstream side of the combustion chamber head, rotating each tool about its axis whilst within the respective aperture for a fuel injector, supplying fluid from the drilling machine through each tool, directing a jet of fluid from each tool with at least a radial component towards the cooling apertures on the upstream side of the combustion chamber head to remove burrs and/or caps adjacent the cooling apertures.

The present disclosure also provides an apparatus for producing cooling apertures in a combustion chamber head, the combustion chamber head having an upstream side, a downstream side and at least one aperture extending therethrough for a fuel injector, the upstream side of the combustion chamber head is inaccessible, the apparatus comprises a drilling machine for mechanically drilling a plurality of cooling apertures through the combustion chamber head from the downstream side of the combustion chamber head, a tool insertable through the at least one aperture for the fuel injector from the downstream side of the combustion chamber, a device to rotate the tool about its axis whilst within the at least one aperture for the fuel injector, the tool having at least one passage extending longitudinally through the tool, a device to supply fluid from the drilling machine through the at least one passage in the tool, the tool having at least one nozzle to direct a jet of fluid from the at least one passage in the tool with at least a radial component towards the cooling apertures on the upstream side of the combustion chamber head to remove burrs and/or caps adjacent the cooling apertures.

The tool may have a plurality of nozzles to direct jets of fluid from the at least one passage in the tool with at least a radial component towards the cooling apertures on the upstream side of the combustion chamber head to remove burrs and/or caps adjacent the cooling apertures.

The tool may have at least one radially extending member and the at least one nozzle is provided at a radially outer end of the radially extending member. The at least one radially extending member may have a plurality of nozzles provided at different radial positions. The at least one radially extending member may have a plurality of nozzles provided at different circumferential positions.

The tool may have a plurality of radially extending members and at least one nozzle is provided at a radially outer end of each radially extending member. Each radially extending member may have a plurality of nozzles provided at different radial positions.

The radially extending members may have different radial length.

Each radially extending member may have a plurality of nozzles provided at different circumferential positions.

Each nozzle may direct the fluid with an axial component towards the upstream side of the combustion chamber head.

The device to supply fluid from the drilling machine is arranged to supply machine coolant.

The tool may be produced by 3D printing. The tool may be produced by direct laser deposition or powder bed laser deposition.

The present disclosure also provides a tool to remove burrs and/or caps adjacent cooling apertures in a combustion chamber head, the tool having at least one passage extending longitudinally through the tool and at least one nozzle to direct a jet of fluid from the at least one passage in the tool with at least a radial component.

The tool may have a plurality of nozzles to direct jets of fluid from the at least one passage in the tool with at least a radial component towards the cooling apertures on the upstream side of the combustion chamber head to remove burrs and/or caps adjacent the cooling apertures.

The tool may have at least one radially extending member and the at least one nozzle is provided at a radially outer end of the radially extending member. The at least one radially extending member may have a plurality of nozzles provided at different radial positions.

The tool may have a plurality of radially extending members and at least one nozzle is provided at a radially outer end of each radially extending member. Each radially extending member may have a plurality of nozzles provided at different radial positions.

The radially extending members may have different radial length.

Each radially extending member may have a plurality of nozzles provided at different circumferential positions.

The at least one nozzle may direct the fluid with an axial component towards the upstream side of the combustion chamber head.

The tool may be produced by 3D printing. The tool may be produced by direct laser deposition or powder bed laser deposition.

BRIEF DESCRIPTION OF THE DRAWINGS

The present disclosure will be more fully described by way of example with reference to the accompanying drawings, in which:—

DETAILED DESCRIPTION

Figure 1:
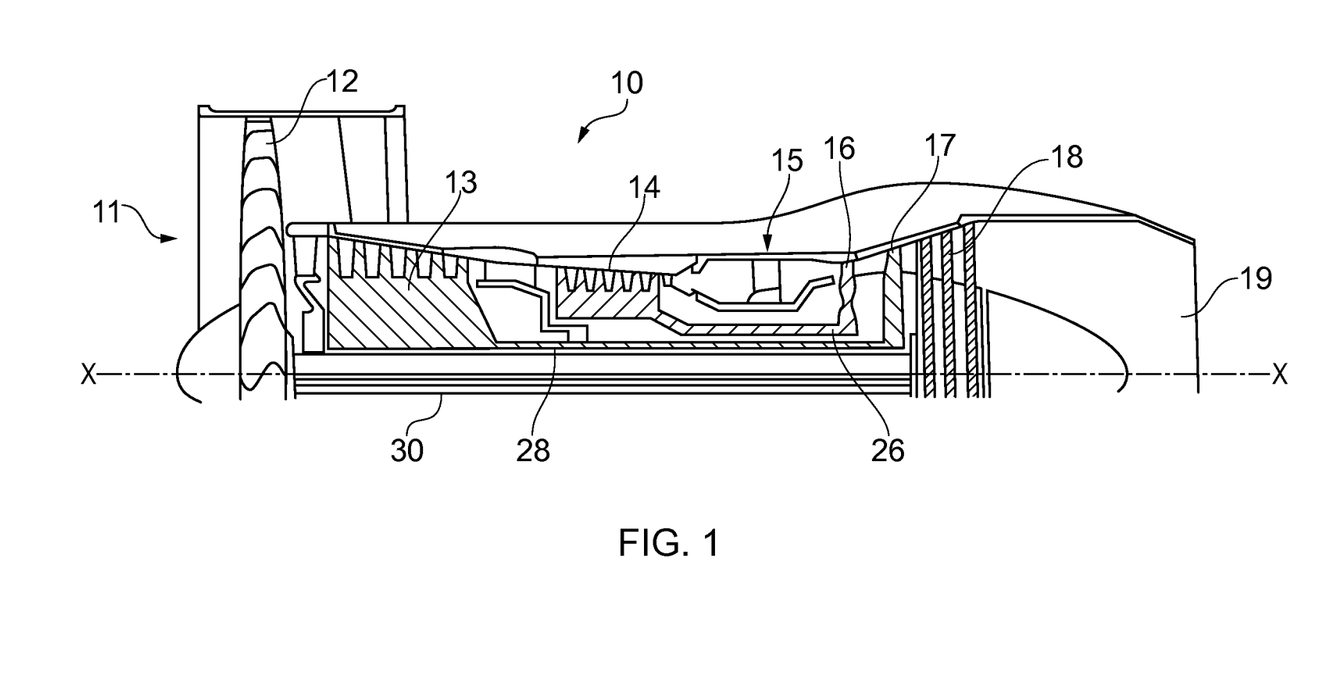
FIG. 1 is partially cut away view of a turbofan gas turbine engine having a combustion chamber head with cooling apertures manufactured using a method according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
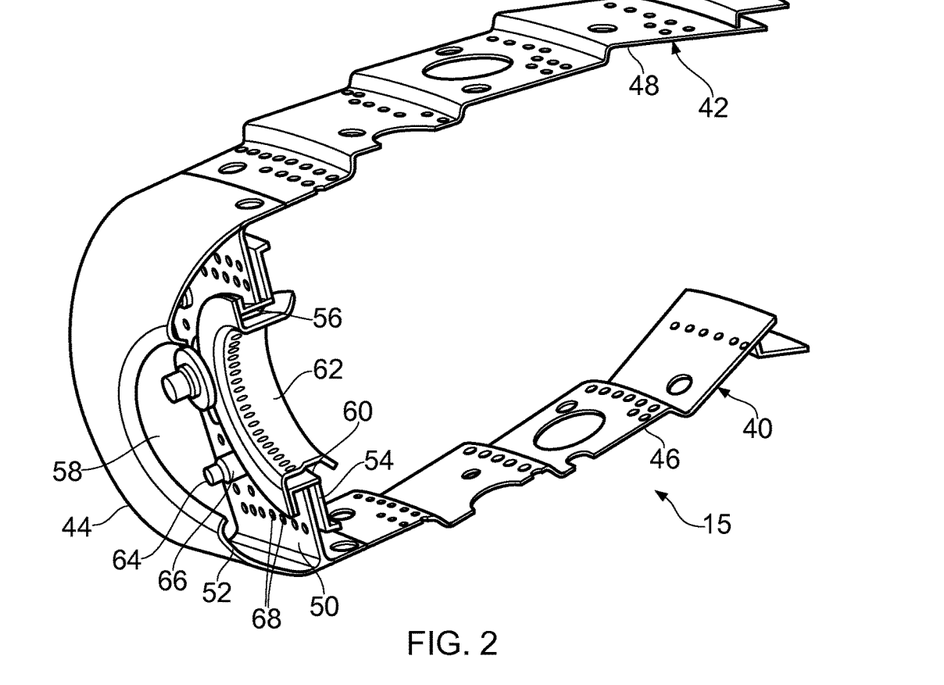
FIG. 2 is an enlarged cross-sectional perspective view of a combustion chamber head with cooling apertures manufactured using a method according to the present disclosure.
Figure 3:
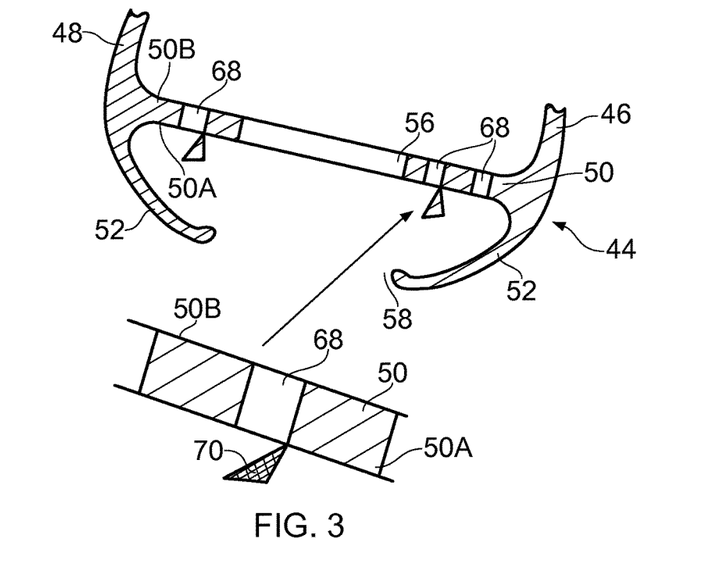
FIG. 3 is a further enlarged cross-sectional view of a combustion chamber head with cooling apertures part way through the manufacturing method according to the present disclosure.

The combustion chamber 15, as shown more clearly in FIGS. 2 and 3, is an annular combustion chamber and comprises a radially inner annular wall structure 40, a radially outer annular wall structure 42 and an annular upstream end wall structure 44. The radially inner annular wall structure 40 comprises a first annular wall 46 and the radially outer annular wall structure 42 comprises a second annular wall 48. The upstream end of the first annular wall 46 is secured to the annular upstream end wall structure 44 and the upstream end of the second annular wall 48 is secured to the annular upstream end wall structure 44. The annular upstream wall structure 44 comprises an annular upstream end wall, or annular head, 50, a domed cowl 52 and a plurality of heat shields 54. The domed cowl 52 is secured to the annular upstream end wall 50 and extends in an upstream direction from the radially inner and radially outer ends of the annular upstream end wall 50. The heat shields 54 are positioned downstream of the annular upstream end wall 50 and are secured to the annular upstream end wall 50. The annular upstream end wall 50 has a plurality of circumferentially spaced apertures 56 and the domed structure 52 has a plurality of circumferentially spaced apertures 58 each one of which is arranged coaxially with a corresponding aperture 56 in the annular upstream end wall 50. Each heat shield 54 has an aperture 60 and the aperture 60 in each heat shield 54 is arranged coaxially with a corresponding one of the apertures 56 in the annular upstream end wall 50. Each heat shield 54 is provided with threaded studs 64 which extend in an upstream direction from the heat shield 54 and pass through apertures in the annular upstream end wall 50 and nuts and washers 66 are provided on the studs 64 to secure the heat shield 54 to the annular upstream end wall 50.

The annular combustion chamber 15 also has a plurality of fuel injectors (not shown) and a plurality of fuel injector seals 62. The fuel injectors are arranged to supply fuel into the annular combustion chamber 15 during operation of the gas turbine engine 10. Each fuel injector locates in a corresponding set of aligned apertures 58, 56 and 60 in the domed structure 52, the annular upstream end wall 50 and a heat shield 54. Each fuel injector seal 62 is aligned with a corresponding one of the apertures 56 in the annular upstream end wall 50 and the aperture 60 in the associated heat shield 54. Each fuel injector is positioned within one of the fuel injector seals 62.

The annular upstream end wall 50 also has a plurality of cooling apertures 68 extending there-through to supply coolant onto the upstream surface of each heat shield 54 to cool the heat shields 54. The cooling apertures 68 extend from the upstream surface 50A to the downstream surface 50B of the annular upstream end wall 50. The heat shields 54 have pedestals (not shown) on their upstream surfaces to aid the cooling of the heat shields 54. The heat shields 54 may also be provided with effusion cooling apertures (not shown) to direct coolant onto the downstream surface of the heat shields 54 to form a film of coolant on the downstream surface of the heat shields 54. The annular upstream end wall 50 may have up to several thousand cooling apertures 68 each having a diameter of 2 mm to 3 mm.

FIG. 3 shows an enlarged portion of the annular upstream end wall, annular head, 50 and one of the cooling apertures 68 after mechanically drilling the cooling apertures 68 through the annular upstream end wall 50. It can be seen that the upstream surface 50A of the annular upstream end wall 50 has a "partially secured cap" secured to and extending from the annular upstream end wall 50 adjacent to the cooling aperture 68. The "partially secured cap" is formed during the drilling of the cooling aperture 68 as the drill bit drills and pushes through the annular upstream end wall 50 and pushes the remaining material, metal, over and away from the cooling hole 68.

Figure 4:
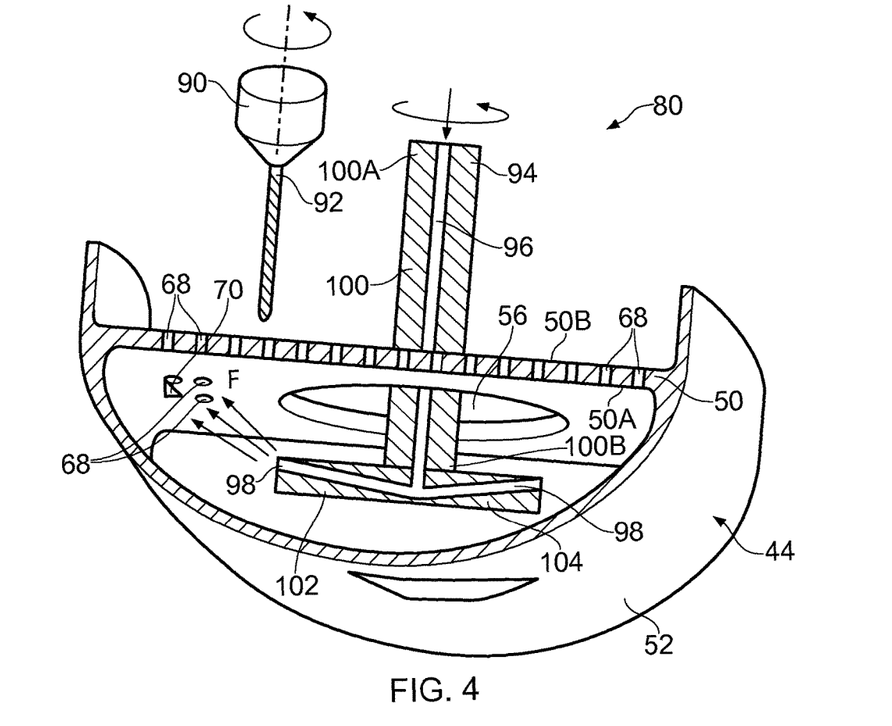
FIG. 4 is an enlarged cross-sectional view of a tool for manufacturing cooling apertures in a combustion chamber head according to the present disclosure.

An apparatus for producing cooling apertures in a combustion chamber head according to the present disclosure is shown in FIG. 4. The apparatus 80 comprises a drilling machine 90 for mechanically drilling a plurality of cooling apertures 68 through the annular upstream end wall, annular head, 50 from the downstream side 50B of the annular upstream end wall, annular head, 50. The drilling machine 90 comprises a drill bit 92 which is rotatably driven by the drilling machine 90. The apparatus 80 also comprises a tool 94 which is insertable through at least one of the apertures 56 for a fuel injector from the downstream side 50B of the annular upstream end wall, annular head, 50. A device (not shown) is arranged to rotate the tool 94 about its axis whilst the tool 94 is within the at least one aperture 56 for the fuel injector. The tool 94 has at least one passage 96 extending longitudinally through the tool 94, a device (not shown) is arranged to supply fluid from the drilling machine 90 through the at least one passage in the tool 94. The tool 94 has at least one nozzle 98 to direct a jet of fluid F from the at least one passage 96 in the tool 94 with at least a radial component towards the cooling apertures 68 on the upstream side 50A of the annular upstream end wall, annular head, 50 to remove burrs and/or caps 70 adjacent the cooling apertures 68. The upstream side 50B of the annular upstream end wall, annular head, 50 is inaccessible.

The tool 94 shown in FIG. 4 has a plurality of nozzles 98 to direct jets of fluid F from the passage 96 in the tool 94 with at least a radial component towards the cooling apertures 68 on the upstream side 50A of the annular upstream end wall, annular head, 50 to remove burrs and/or caps 70 adjacent the cooling apertures 68. The nozzles 98 also direct the fluid with an axial component towards the upstream surface 50A of the annular upstream end wall, annular head, 50. The tool 94 comprises a central cylindrical member 100 which has first and second axial ends 100A and 100B. The central cylindrical member 100 has two radially extending members 100 and 102 arranged at the second end 100B and the nozzles 98 are provided at the radially outer ends of the radially extending members 100 and 102. The first end 100A is configured and adapted to be connected to the device to rotate the tool 94 and to the device to supply fluid to the tool 94. The device to rotate the tool and the device to supply fluid to the tool may be a single device, for example a hollow drive shaft through which fluid is supplied to the tool and which drives the tool 94. The first end 100A of the tool 94 may be provided with internal or external surfaces so that it may be driven by the device, e.g. drive shaft, to rotate the tool 94. The first end 100A of the tool 94 may also be provided with internal seals. The radially extending members 102 and 104 extend in diametrically opposite directions from the central cylindrical member 100 and in this example the distance between the radially outer ends of the radially extending members 102 and 104 is less than the diameter of the aperture 56 to enable the second end 100B of the central cylindrical member 100 to be inserted through the aperture 56 for a fuel injector.

In operation the drilling machine 90 mechanically drills a plurality, all, of the cooling apertures 68 through the annular upstream end wall, annular head, 50 from the downstream surface 50B of the annular upstream end wall, annular head, 50. Then the tool 94 is inserted through at least one aperture 56 for a fuel injector from the downstream side 50B of the annular upstream end wall, annular head, 50. The tool 94 is rotated about its axis whilst within the at least one aperture 56 for a fuel injector and fluid is supplied from the drilling machine through the passage 96 in the tool 94. Jets of fluid F are directed from the nozzles 98 in the tool 94 with at least a radial component towards the cooling apertures 68 on the upstream surface 50A of the annular upstream end wall, annular head, 50 to remove any burrs and/or caps 70 adjacent to the cooling apertures 68. The jets of fluid F are directed from the nozzles 98 also with an axial component towards the upstream surface 50A of the annular upstream end wall, annular head, 50.

The tool may be rotated at a speed of 5 to 200 revolutions per minute, the fluid may be supplied at a pressure of 70 to 150 bar (7 to 15 MPa) and the fluid may be supplied at a flow rate of 0.15 to 0.4 liters per second.

In one method according to the present disclosure the tool 94 is inserted through each aperture 56 in turn from the downstream side 50B of the annular upstream end wall, annular head, 50. The tool 94 is rotated about its axis whilst within the respective aperture 56 and fluid is supplied from the drilling machine through the passage 96 in the tool 94. The jets of fluid F are directed from the nozzles 98 in the tool 94 with at least a radial component towards the cooling apertures 68 on the upstream side 50A of the annular upstream end wall, annular head, 50 to remove burrs and/or caps 70 adjacent to the cooling apertures 68.

In another method according to the present disclosure a plurality of tools 94 may be used. Each tool 94 is inserted through a respective one of the apertures 56 from the downstream side 50B of the annular upstream end wall, annular head, 50 and each tool 94 is rotated about its axis whilst within the respective aperture 56 and fluid is supplied from the drilling machine through the passage 96 in each tool 94. The jets of fluid F are directed from the nozzles 98 in each tool 94 with at least a radial component towards the cooling apertures 68 on the upstream side 50A of the annular upstream end wall, annular head, 50 to remove burrs and/or caps 70 adjacent to the cooling apertures 68.

Figure 5:
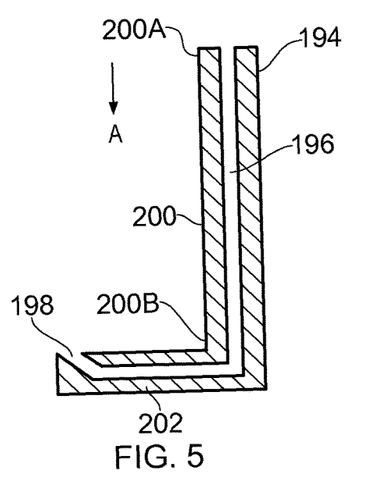
FIG. 5 is an enlarged cross-sectional view of another tool for manufacturing cooling apertures in a combustion chamber head according to the present disclosure.
Figure 6:
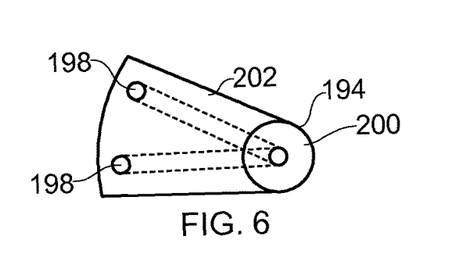
FIG. 6 is a plan view of the tool looking in the direction of arrow A in FIG. 5.

FIGS. 5 and 6 show an alternative tool 194 which comprises a central cylindrical member 200 which has first and second axial ends 200A and 200B. The central cylindrical member 200 has a single radially extending member 200 arranged at the second end 200B and two circumferentially spaced nozzles 198 are provided at the radially outer end of the radially extending member 200. The first end 200A is connected to the device to rotate the tool 194 and to the device to supply fluid to the tool 194. In this example the distance between the radially outer end of the radially extending member 202 and the diametrically opposite point on the central cylindrical member 200 is less than the diameter of the aperture 56 to enable the second end 200B of the central cylindrical member 200 to be inserted through the aperture 56 for a fuel injector.

The tool 194 may be used in the two methods described above, but the tool 194 is initially inserted through the aperture 56 for a fuel injector with the axis of the central cylindrical member 200 offset from the axis of the aperture 56 and then the axis of the central cylindrical member 200 is placed coaxial with the axis of the aperture 56 and the tool 194 is rotated for de-burring or de-capping of the cooling apertures 68. It may also be possible to rotate the tool 194 about a number of axes parallel with the axis of the aperture 56 to de-burr or de-cap cooling apertures 68 farther away from the axis of the aperture 56. In another method it may be possible to inert a number of tools 194 sequentially in each aperture 56 and each of the tools 194 has a radially extending member 202 with a different length so as to de-burr or de-cap cooling apertures 68 at different distances from the aperture 56.

Figure 7:
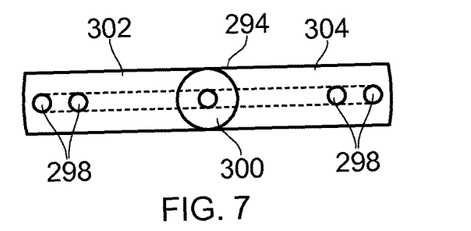
FIG. 7 is a plan view of a further tool for manufacturing cooling apertures in a combustion chamber head according to the present disclosure.

FIG. 7 shows an alternative tool 294 which comprises a central cylindrical member 300 which has first and second axial ends. The central cylindrical member 300 has two radially extending members 300 and 302 arranged at the second end and each radially extending member 300 and 302 has a plurality of nozzles 298 provided at different radial positions. One of the nozzles 298 in each of the radially extending members 300 and 302 is provided at the radially outer end of the radially extending member 300 and 302. The first end is connected to the device to rotate the tool 294 and to the device to supply fluid to the tool 294. The radially extending members 302 and 304 extend in diametrically opposite directions from the central cylindrical member 300 and again in this example the distance between the radially outer ends of the radially extending members 302 and 304 is less than the diameter of the aperture 56 to enable the second end 300B of the central cylindrical member 300 to be inserted through the aperture 56 for a fuel injector. The tool 294 may also be used in the two methods described above.

Other embodiments of tool may have a plurality of radially extending members and the radially extending members have different radial lengths. Each radially extending member may have a plurality of nozzles provided at different circumferential positions. Each radially extending member may have a plurality of nozzles provided at different axial positions. Another embodiment simply uses a central cylindrical member without radially extending members. In this embodiment the nozzles are provided in the periphery of the central cylindrical member at the second end of the central cylindrical member and the nozzles are arranged to direct fluid at least with a radial component and preferably with an axial component towards the upstream surface of the annular upstream end wall. The central member may have other suitable cross-section shapes for example polygonal shapes, e.g. square, hexagonal etc.

Figure 8:
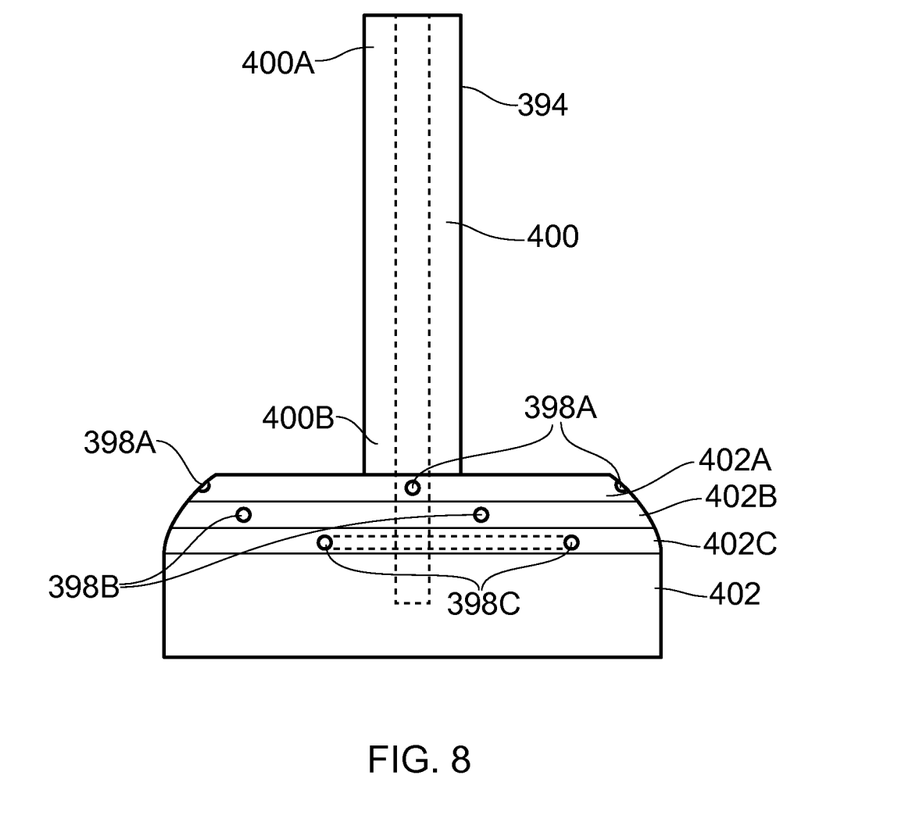
FIG. 8 is an enlarged side view of an additional tool for manufacturing cooling apertures in a combustion chamber head according to the present disclosure.

FIG. 8 shows an alternative tool 394 which comprises a central cylindrical member 400 which has first and second axial ends. The central cylindrical member 400 has a single annular radially extending member 402 arranged at the second end and the annular radially extending member 402 has three rows of nozzles 398A, 398B and 398C provided at the radially outer end of the annular radially extending member 402. The rows of nozzles 398A, 398B and 398C are arranged at different axial positions. Each of the three rows of nozzles 398A, 398B and 398C comprises four nozzles arranged 90° apart. The nozzles in the rows of nozzles 398A, 398B and 398C are staggered circumferentially around the circumference of the annular radially extending member 402 such that the nozzles 398B are spaced 30° from the nozzles 398A and the nozzles 398C are spaced 30° from the nozzles 398B and are spaced 30° from the nozzles 398A. The three sets of nozzles 398A, 398B and 398C in the annular radially extending member 402 are provided at the radially outer end of the annular radially extending member 402. The radially outer end of the radially extending member 402 has three frustoconical surfaces 402A, 402B and 402C arranged at different angles with respect to the axis of the central cylindrical member 400 and each row of nozzles 398A, 398B and 398C is arranged in a respective one of the frustoconical surfaces 402A, 402B and 402C. Thus, the nozzles 398C are arranged to direct the fluid at a greater angle to the axis of the central cylindrical member 400 than the nozzles 398B and the nozzles 398B are arranged to direct the fluid at a greater angle to the axis of the central cylindrical member 400 than the nozzles 398A. The first end 400A of the central cylindrical member 400 is connected to the device to rotate the tool 394 and to the device to supply fluid to the tool 394. The diameter of the annular radially extending member 402 is less than the diameter of the aperture 56 to enable the annular radially extending member 402 to be inserted through the aperture 56 for a fuel injector. The tool 394 may also be used in the two methods described above. Other suitable numbers of rows of nozzles, other suitable numbers of nozzles per row and any suitable angles for the angles of the nozzles in the different rows of nozzles may be used.

The device to supply fluid from the drilling machine is preferably arranged to supply machine coolant. The machine coolant is either a water, or an oil, based fluid which is used to lubricate the cutting tool, e.g. the drill bit, and remove heat during the cutting process, e.g. the drilling process. The device to rotate the tool may be the drilling machine, e.g. a machining centre. The drilling tool is removed from the drilling machine after the cooling holes have been drilled and then the tool is loaded onto the drilling machine to remove the burrs and caps from the cooling holes.

It is to be noted that each of the tools described above enable the removal of burrs and/or partially secured caps from a plurality of cooling holes at a time by rotation of the tool about its axis whilst located within a respective fuel injector aperture and when fluid is supplied from the drilling machine through the passage and nozzles in the tool. The jets of fluid directed from the nozzles in the tool with at least a radial component towards the cooling apertures on the upstream side of the annular upstream end wall, annular head, to remove burrs and/or partially secured caps from a plurality of cooling apertures at a time. It may be possible to rotate the tool around the axis of the fuel injector aperture in addition to rotating the tool about its own axis whilst located within a respective fuel injector aperture.

The tool may be produced by 3D printing. The tool may be produced by direct laser deposition or powder bed laser deposition or other additive layer manufacturing technique. The use of 3D printing to manufacture the tool enables complex passages and/or complex nozzles and hence complex coolant flow paths to be produced in the tool.

Although the present disclosure has referred to producing cooling apertures in an annular combustion chamber head it is equally applicable to producing cooling apertures in a tubular combustion chamber head.

The advantage of the present disclosure is that it enables the removal of burrs and/or partially secured caps from the upstream side of a combustion chamber head in a fast and effective manner which does not require an additional operation. The present disclosure enables cooling apertures to be drilled through a combustion chamber head using conventional mechanical drilling in a viable and cost effective manner. It is estimated that producing cooling apertures in a combustion chamber head using the method according to the present disclosure reduces the manufacturing time by about 40% compared to a producing cooling apertures in a combustion chamber head using electro-discharge machining (EDM). The cooling apertures produced in the combustion chamber head using mechanical drilling have improved quality compared to those produced by electro-discharge machining (EDM). In particular the cooling apertures produced by mechanical drilling have sides which are more parallel than those produced by electro-discharge machining (EDM), which tend to be tapered. The cooling apertures produced by mechanical drilling have improved surface finish and tighter tolerances compared to those produced by electro-discharge machining (EDM). The cooling holes may be more accurately positioned using mechanical drilling compared to those produced by electro-discharge machining (EDM).

The invention claimed is:

1. A method of producing cooling apertures in a combustion chamber head, the combustion chamber head having an upstream side, a downstream side and at least one aperture extending there-through for a fuel injector, the upstream side of the combustion chamber head is inaccessible, the method comprising providing a drilling machine, mechanically drilling a plurality of cooling apertures through the combustion chamber head from the downstream side of the combustion chamber head, inserting a tool through the at least one aperture for the fuel injector from the downstream side of the combustion chamber head, rotating the tool about its axis whilst within the at least one aperture for the fuel injector, supplying fluid from the drilling machine through the tool, directing a jet of fluid from the tool with at least a radial component towards the cooling apertures on the upstream side of the combustion chamber head to remove burrs and/or caps adjacent the cooling apertures.

2. The method as claimed in claim 1 comprising directing a plurality of jets of fluid from the at least one passage in the tool with at least a radial component towards the cooling apertures on the upstream side of the combustion chamber head to remove burrs and/or caps adjacent the cooling apertures.

3. The method as claimed in claim 1 comprising directing the at least one jet of fluid with an axial component towards the upstream side of the combustion chamber head.

4. The method as claimed in claim 3 comprising directing a plurality of jets of fluid from the at least one passage in the tool with axial components towards the upstream side of the combustion chamber head.

5. The method as claimed in claim 1 comprising supplying machine coolant from the drilling machine through the tool.

6. The method as claimed in claim 1 wherein the combustion chamber head is an annular combustion chamber head having a plurality of circumferentially spaced fuel injector apertures, the method comprising inserting the tool through each aperture for a fuel injector from the downstream side of the combustion chamber head, rotating the tool about its axis whilst within the respective aperture for a fuel injector, supplying fluid from the drilling machine through the tool, directing a jet of fluid from the tool with at least a radial component towards the cooling apertures on the upstream side of the combustion chamber head to remove burrs and/or caps adjacent the cooling apertures.

7. The method as claimed in claim 1 wherein the combustion chamber head is an annular combustion chamber head having a plurality of circumferentially spaced fuel injector apertures, the method comprising providing a plurality of tools, inserting each tool through a respective one of the apertures for a fuel injector from the downstream side of the combustion chamber head, rotating each tool about its axis whilst within the respective aperture for a fuel injector, supplying fluid from the drilling machine through each tool, directing a jet of fluid from each tool with at least a radial component towards the cooling apertures on the upstream side of the combustion chamber head to remove burrs and/or caps adjacent the cooling apertures.

8. An apparatus for producing cooling apertures in a combustion chamber head, the combustion chamber head having an upstream side, a downstream side and at least one aperture extending there-through for a fuel injector, the upstream side of the combustion chamber head is inaccessible, the apparatus comprises a drilling machine for mechanically drilling a plurality of cooling apertures through the combustion chamber head from the downstream side of the combustion chamber head, a tool insertable through the at least one aperture for the fuel injector from the downstream side of the combustion chamber, a device to rotate the tool about its axis whilst within the at least one aperture for the fuel injector, the tool having at least one passage extending longitudinally through the tool, a device to supply fluid from the drilling machine through the at least one passage in the tool, the tool having at least one nozzle to direct a jet of fluid from the at least one passage in the tool with at least a radial component towards the cooling apertures on the upstream side of the combustion chamber head to remove burrs and/or caps adjacent the cooling apertures.

9. The apparatus as claimed in claim 8 wherein the tool has a plurality of nozzles to direct jets of fluid from the at least one passage in the tool with at least a radial component towards the cooling apertures on the upstream side of the combustion chamber head to remove burrs and/or caps adjacent the cooling apertures.

10. The apparatus as claimed in claim 8 wherein the tool has at least one radially extending member and the at least one nozzle is provided at a radially outer end of the radially extending member.

11. The apparatus as claimed in claim 10 wherein the at least one radially extending member has a plurality of nozzles provided at different radial positions.

12. The apparatus as claimed in claim 10 wherein the tool has a plurality of radially extending members and at least one nozzle is provided at a radially outer end of each radially extending member.

13. The apparatus as claimed in claim 12 wherein each radially extending member has a plurality of nozzles provided at different radial positions.

14. The apparatus as claimed in claim 12 wherein the radially extending members have different radial lengths.

15. The apparatus as claimed in claim 12 wherein each radially extending member has a plurality of nozzles provided at different circumferential positions.

16. The apparatus as claimed in claim 10 wherein the radially extending member has a plurality of nozzles provided at different circumferential positions.

17. The apparatus as claimed in claim 8 wherein each nozzle directs the fluid with an axial component towards the upstream side of the combustion chamber head.

18. The apparatus as claimed in claim 8 wherein the device to supply fluid from the drilling machine is arranged to supply machine coolant.

19. The apparatus as claimed in claim 8 wherein the tool is produced by 3D printing.

* * * * *